United States Patent Office 2,989,403
Patented June 20, 1961

2,989,403
CANNING PROCESSES
George J. Malecki, 519 W. Surf St., Chicago, Ill.
No Drawing. Filed June 11, 1958, Ser. No. 741,242
8 Claims. (Cl. 99—186)

This invention relates to processes for preserving the color of canned green vegetables and more particularly is an improvement on the process described in my recently issued Patent No. 2,827,382, granted March 18, 1958.

It has been known for years that the green color of the peas or other vegetables canned by conventional procedure would be retained during the canning process if the canning solution was initially sufficiently alkaline for the pH of the solution after canning to be 8.0 to 8.5. It was also known that the pH of cans stored at normal atmospheric temperatures gradually changed toward the acid side with a gradual change in color. It was also known that if the above stated alkalinity after canning was obtained by merely adding sufficient alkalis such as sodium hydroxide to the canning solution the taste and texture of the vegetables was adversely affected, and much effort has heretofore been spent in developing methods for obtaining the stated pH after canning without adversely affecting the taste and texture of the vegetables and for retarding the change in pH after canning.

By the process of my above-mentioned patent the pH after canning is 8.0 to 8.5, the taste and texture of the canned vegetables are of superior quality and the green color is retained under all usual storage conditions for six to nine months.

For commercial reasons, however, it is highly desirable that canned vegetables remain unchanged in storage from one canning season until the next. This is true of many canned products, such as tomatoes, corn, fruit and the like and it is a fact that the extra cost of marketing a canned product that has a limited shelf life is such that the market for "processed" peas and other green vegetables is quite limited, not withstanding the recognized superior qualities of such products.

By my present process the pH of the canning solution after canning is within the range 8.5 to 9.7, preferably 9.0, with a permissible maximum of 10.5. With this increase in initial pH after canning there will be little change in color during a twelve months' storage period at ordinary warehouse temperatures. If the processes of the prior art are modified by the addition of alkali sufficient to obtain an initial pH after canning within the specified range, both the taste and texture of the vegetables are adversely affected. By the process forming the subject-matter of this application this initial pH after canning can be obtained without affecting the taste and texture of the canned vegetables and although the alkalinity of the solution will decrease to a limited extent during the twelve months' storage period, such difference is not noticeable to the consumer and unless a pH determination is made or the canning solution is analyzed the canned product at the end of the storage period is indistinguishable from more recently produced cans from the same source.

I will first describe my invention by giving specific examples of processes which have been used with satisfactory results.

*Example 1.*—Product green peas. Peas are vined, cleaned, washed and sieve sized as in conventional practice. The peas are then put through a continuous blancher, preferably of the screw and drum type, containing a soft water solution of calcium chloride with concentration of 2300 p.p.m. calculated as $CaCO_3$, and pH adjusted to 7.7, if necessary. The pH adjustment can be made with dilute hydrochloric acid or calcium hydroxide. The pH should be checked every 5–10 minutes and adjusted accordingly. The pH is not very critical and may vary about 0.4 in each direction, but the checking should be at sufficiently frequent intervals to keep the pH within this range. The blanching solution is heated to about 200° F. and the operation is completed in about seven minutes. Neither time nor temperature is particularly critical.

The peas are then cooled with water, gravity separated, sorted and filled into cans together with a preheated (to 180° F.) brine of the usual composition to which is added for each 16 ounce can, 4.4 ml. of one molar disodium glutamate, 5.5 ml. of 10% by weight sodium hydroxide and 200 p.p.m. of $SO_2$ (for instance 2 ml. of 10% by weight sodium sulfite (anhydrous)). Thereafter the cans are closed, preferably in a 15 inch vacuum and sterilized in a vertical retort for 6.5 minutes at 261° F. The cans are then pressure cooled with water preferably at 85°.

*Example 2.*—Product lima beans. The beans are prepared for canning by the usual procedure. They are then blanched in a solution of calcium glutamate with 6000 p.p.m. calculated as $CaCO_3$ and adjusted to pH 8.7. The blanching solution is maintained at 200° F. and is continued for about seven minutes. pH variations 0.2 are allowable in each direction. The pH should be checked and adjusted every 5–10 minutes to 8.7. To the conventional sugar-salt there is added, for each 12 ounce can 4.2 ml. of disodium glutamate one molar, 6 ml. of sodium hydroxide 10% (by weight), and 2 ml. of sodium sulfite 10% (by weight as anhydrous) (equal to about 200 p.p.m. $SO_2$). The conventional high temperature-short time process is preferable for cooking and sterilizing.

*Example 3.*—Product green peas. The process is carried out as in Example 1, except that the blanching is done in a solution of calcium glycinate in an amount equivalent to 3000 p.p.m. as $CaCO_3$, and the pH adjusted to 7.8. Allowable variations are 0.2 in each direction. The pH is checked and adjusted every 5–10 minutes to 7.8. The canning solution contains the conventional amounts of salt and sugar and for each 16 ounce can 7 ml. of sodium glycinate one molar, 4.5 ml. of sodium hydroxide 10% by weight and 1.5 ml. of sodium sulfite 10% by weight (as anhydrous) equal to 150 p.p.m. $SO_2$. The cans are processed 10.5 minutes at 253° F. in a rotary cooker and are then pressure cooled to 70° F.

*Example 4.*—Product green peas. The process is carried out as in Example 1 except that the blanching solution is an aqueous solution of calcium lysinate of 6000 p.p.m. calculated as $CaCO_3$, and the pH is maintained at 8.0 with a plus or minus range of 0.4. The brine contains the conventional amounts of salt and sugar, with the addition of 5 ml. of potassium methionate one molar, 5 ml. of potassium hydroxide 10% by weight, and 200 p.p.m. $SO_2$ (added as potassium sulfite anhydrous) for each 16 ounce can.

In the foregoing examples the designated calcium salts used in the balancing solution are to be regarded as typical of the calcium compounds which may be employed. My experiments indicate that the calcium radical in the solution is effective in conditioning the green vegetables for canning and any innocuous calcium salt which supplies such calcium radicals to the solution without otherwise adversely affecting the product could be used instead. Also, other alkalis and acids may be used in controlling the pH of the blanching solution with the same results so far as the preservation of the green vegetables is concerned. The alkalis and acids used should of course be acceptable food additives. Other buffering agents and other reducing agents than those specified may be substituted in making up the canning solution. In my above-mentioned patent I have mentioned other reducing agents which could be substituted for those specified. However, I have found that sulfites of the character recited above are particularly effective for improving both the color stability and the flavor.

My present invention is based on the discovery that if the peas or other green vegetables are blanched in the manner described in a solution of a calcium salt maintained at a pH in the range 7.5–9.0 the vegetables may then be canned in a canning solution of such alkalinity as to have a pH after canning of the range specified without adversely affecting either the texture or flavor of the vegetables. The concentration of the calcium salt solution is not critical and generally speaking, to get the same benefits with a weaker solution a longer period of blanching is required.

The addition of disodium glutamate or other suitable buffering agent such, for example, as those specified in my co-pending application Ser. No. 445,173, filed July 22, 1954, improves the flavor and prolongs the period of color retention. Among all these buffering agents known to me the best suitable are the dibasic alkali metal and alkaline earth metal salts of glutamic acid. After the glutamates the most suitable are the salts of aminoacids available at economic price, such as lysine, aspartic acid, methionine, and glycine. Methionine offers additional nutritional advantages in case of peas because these are known to be deficient in methionine. Other reducing agents may be substituted in whole or in part for sodium sulphite, preferably agents taken from the group consisting of the alkali metal and alkaline earth metal salts of ascorbic acid, phosphorus acid and sulphurous acid. The use of sulfites or other reducing agents improves the color retention and flavor. Sulfites also help in the retention of vitamin C (ascorbic acid) in canned peas as compared to same peas canned without sulfite. For this purpose it is particularly advantageous to add calcium sulfite (0.01% to 0.1%) to the blanching liquid containing calcium chloride or other calcium salt, as described above. Calcium sulfite has a very low solubility of about 0.0011% as $CaSO_3 \cdot 2H_2O$ at 100° C. and for this reason it has not much effect on the calcium cation concentration in blanching, while it exerts a beneficial influence on vitamin C retention by preventing its oxidation with air at the high temperature of blanching. It should be noted that majority of vitamin C losses in canning occurs during the blanching (about 60%). The addition of calcium sulfite to the blanching solution helps also in color retention and obtaining of a better flavor.

The principal advantage of blanching the green vegetables in a calcium salt solution of controlled alkalinity within the range specified is that it makes it possible to use canning solutions of higher pH values after canning than heretofore possible. The blanching procedure herein described may be used with advantage in conjunction with the process of my granted patent and other processes wherein the pH of the canning solution after canning is below 8.5. The addition of the above-described blanching procedure to these processes prolongs the period of color retention during storage at atmospheric temperatures.

The quantities of the various additives specified in the above examples are the minimum quantities which may be employed to obtain the best possible results with proper allowance for manufacturing tolerances. Added amounts which do not increase the pH of the blanching solution or the canning solution beyond the specified ranges will not significantly affect the taste, texture or color retention of the canned product.

While the foregoing examples represent the best procedure now known to me for practicing my invention, it is to be understood that the invention is not limited to such examples except insofar as recited in the appended claims.

I claim:

1. The process of preserving color in canned green vegetables comprising blanching the vegetables with a calcium salt solution while maintaining the pH of the blanching solution within the range of 7.5–9.0 and thereafter canning the vegetables in a canning solution of such alkalinity that the pH after canning is in the range of 8.0 to 10.5.

2. The process of claim 1 wherein a buffering agent is added to the canning solution.

3. The process of claim 2 wherein the buffering agent is selected from the group consisting of the dibasic alkali metal and alkaline earth metal salts of glutamic acid.

4. The process of claim 1 wherein the calcium salt is calcium chloride.

5. The process of claim 1 wherein a reducing agent from the group consisting of the alkali metal and alkaline earth metal salts of ascorbic acid, phosphorous acid and sulfurous acid is added to the canning solution.

6. The process of claim 1 wherein a buffering agent and a reducing agent from the group consisting of the alkali metal and alkaline earth metal salts of ascorbic acid, phosphorous acid and sulphurous acid is added to the canning solution.

7. The process of claim 1 wherein disodium glutamate and sodium sulfite are added to the canning solution.

8. The process of preserving color in canned green vegetables comprising blanching the vegetables with a calcium salt solution while maintaining the pH of the blanching solution within the range of 7.5–9.0 and thereafter canning the vegetables in a canning solution of such alkalinity that the pH after canning is in the range of 8.5 to 9.7.

References Cited in the file of this patent

UNITED STATES PATENTS

| | | |
|---|---|---|
| 2,189,774 | Blair | Feb. 13, 1940 |
| 2,318,426 | Schroder | May 4, 1943 |
| 2,549,781 | Emmons | Apr. 24, 1951 |
| 2,827,382 | Malecki | Mar. 18, 1958 |